United States Patent
Holland et al.

(10) Patent No.: US 10,190,406 B2
(45) Date of Patent: Jan. 29, 2019

(54) FORMATION FRACTURING POTENTIAL USING SURROUNDING PORE PRESSURES

(71) Applicants: Marc Holland, Mainz (DE); Wouter Van Der Zee, Voorburg (NL)

(72) Inventors: Marc Holland, Mainz (DE); Wouter Van Der Zee, Voorburg (NL)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 520 days.

(21) Appl. No.: 14/581,255

(22) Filed: Dec. 23, 2014

(65) Prior Publication Data

US 2016/0177706 A1     Jun. 23, 2016

(51) Int. Cl.
  *E21B 47/06*   (2012.01)
  *E21B 43/24*   (2006.01)
  *E21B 49/00*   (2006.01)

(52) U.S. Cl.
  CPC .......... *E21B 47/06* (2013.01); *E21B 43/2406* (2013.01); *E21B 49/006* (2013.01); *G01V 2210/6248* (2013.01)

(58) Field of Classification Search
  CPC .... E21B 43/2406; E21B 49/006; E21B 47/06; G01V 2210/6248
  See application file for complete search history.

(56) References Cited

U.S. PATENT DOCUMENTS

| | | | | |
|---|---|---|---|---|
| 4,043,192 A | * | 8/1977 | Shuck | E21B 33/1243 73/152.41 |
| 4,440,226 A | * | 4/1984 | Suman, Jr. | E21B 33/1243 166/187 |
| 5,115,871 A | * | 5/1992 | McCann | E21B 21/08 175/50 |
| 5,226,310 A | * | 7/1993 | Steiger | E21B 49/006 73/38 |
| 5,282,384 A | * | 2/1994 | Holbrook | E21B 21/08 702/12 |
| 5,497,658 A | * | 3/1996 | Fletcher | E21B 43/26 166/250.01 |

(Continued)

OTHER PUBLICATIONS

Miller et al., A three-dimensional fluid-controlled earthquake model:Behavior and implications,Journal of Geophysical Research, vol. 104, No. B5, pp. 10,621-10,638, May 10, 1999.*

(Continued)

*Primary Examiner* — Janet Suglo
*Assistant Examiner* — Liam R Casey
(74) *Attorney, Agent, or Firm* — Cantor Colburn LLP

(57) ABSTRACT

A method for conducting an earth reservoir process includes receiving a stress field of a reservoir that includes a pore pressure field for a rock volume, selecting a search radius extending from a grid cell of interest, and substituting a pore pressure from a plurality of surrounding grid cells within the selected radius for the pore pressure of the grid cell of interest and determining if a critical stress state exists for each of the substituted pore pressures. The method further includes determining a shortest distance to a grid cell in the plurality of surrounding grid cells having a pore pressure that yields a critical stress state when substituted in the grid cell of interest and conducting the earth reservoir process with earth reservoir process apparatus using a parameter related to the determined shortest distance.

21 Claims, 10 Drawing Sheets

(56) References Cited

U.S. PATENT DOCUMENTS

| | | | | |
|---|---|---|---|---|
| 5,859,367 A * | 1/1999 | Holbrook | E21B 49/00 | 166/250.01 |
| 5,965,810 A * | 10/1999 | Holbrook | E21B 47/06 | 166/254.1 |
| 6,434,487 B1 * | 8/2002 | Thompson | G01V 1/30 | 702/14 |
| 6,549,854 B1 * | 4/2003 | Malinverno | G01V 1/282 | 367/73 |
| 6,609,067 B2 * | 8/2003 | Tare | E21B 21/08 | 702/9 |
| 6,826,486 B1 * | 11/2004 | Malinverno | E21B 44/00 | 367/73 |
| 6,968,274 B2 * | 11/2005 | Tutuncu | E21B 49/005 | 367/38 |
| 8,190,369 B2 * | 5/2012 | Moos | E21B 7/06 | 702/9 |
| 8,274,399 B2 * | 9/2012 | Strachan | E21B 44/00 | 340/853.6 |
| 8,341,984 B2 * | 1/2013 | Bachrach | G01V 1/303 | 70/18 |
| 8,768,671 B2 * | 7/2014 | Lee | E21B 47/022 | 703/10 |
| 8,995,224 B2 * | 3/2015 | Esmersoy | G01V 1/303 | 367/25 |
| 9,238,942 B2 * | 1/2016 | Moos | E21B 7/06 | |
| 9,249,654 B2 * | 2/2016 | Strachan | E21B 44/00 | |
| 2002/0010548 A1 * | 1/2002 | Tare | E21B 21/08 | 702/9 |
| 2002/0159332 A1 * | 10/2002 | Thomann | G01V 1/16 | 367/15 |
| 2004/0236513 A1 * | 11/2004 | Tutuncu | E21B 49/005 | 702/11 |
| 2005/0041526 A1 * | 2/2005 | Esmersoy | G01V 1/303 | 367/27 |
| 2006/0129366 A1 * | 6/2006 | Shaw | E21B 49/006 | 703/10 |
| 2009/0065252 A1 * | 3/2009 | Moos | E21B 7/06 | 175/50 |
| 2010/0076738 A1 * | 3/2010 | Dean | E21B 43/26 | 703/7 |
| 2010/0259415 A1 * | 10/2010 | Strachan | E21B 44/00 | 340/853.6 |
| 2010/0305865 A1 * | 12/2010 | Bachrach | G01V 1/303 | 702/11 |
| 2011/0174541 A1 * | 7/2011 | Strachan | E21B 44/00 | 175/27 |
| 2011/0264429 A1 * | 10/2011 | Lee | E21B 47/022 | 703/10 |
| 2012/0217008 A1 * | 8/2012 | Moos | E21B 7/06 | 166/250.01 |
| 2013/0066471 A1 * | 3/2013 | Wang | G05B 13/00 | 700/275 |
| 2013/0116928 A1 * | 5/2013 | Bachrach | G01V 1/303 | 702/18 |
| 2016/0370499 A1 * | 12/2016 | Berard | G01V 11/00 | |

OTHER PUBLICATIONS

Longuemare, et al.; "Geomechanics in Reservoir Simulation: Overview of Coupling Methods and Field Case Study"; Oil & Gas Science and Technology—Rev. IFP; vol. 57, No. 5; (2002); pp. 471-483.

Turuntaev, et al.; "Formation Fracturing by Pore Pressure Drop (Labratory Study)"; Conference Paper; (May 2013); 21 pages.

* cited by examiner

US 10,190,406 B2

FORMATION FRACTURING POTENTIAL USING SURROUNDING PORE PRESSURES

BACKGROUND

Cap rock refers to the rock that caps a reservoir thereby keeping the reservoir fluids contained in the reservoir and preventing their leakage out. Reservoir engineers are interested in maintaining the integrity of the cap rock to insure that production of the reservoir fluids can be controlled. Unfortunately, excessive extremes in stresses, pore pressure or temperature can fracture cap rock. Hence, reservoir engineers want to know the potential for fracturing cap rock in order to properly plan production parameters for producing the reservoir fluids. For example, proper Steam Assisted Gravity Drainage (SAGD) planning requires setting limits to the operational parameters (such as temperature and pressure of steam, duration of steam injection, etc.) so that the cap rock remains intact by avoiding the formation of cap rock fractures. Hence, it would be well received in the oil and gas production industries if methods were developed to estimate the potential for cap rock to fracture.

BRIEF SUMMARY

Disclosed is a method for conducting an earth reservoir process. The method includes: receiving a stress field of a reservoir that includes a pore pressure field for a rock volume; selecting a search radius extending from a grid cell of interest; substituting a pore pressure from a plurality of surrounding grid cells within the selected radius for the pore pressure of the grid cell of interest and determining if a critical stress state exists for each of the substituted pore pressures; determining a shortest distance to a grid cell in the plurality of surrounding grid cells having a pore pressure that yields a critical stress state when substituted in the grid cell of interest; and conducting the earth reservoir process with earth reservoir process apparatus using a parameter related to the determined shortest distance; wherein the receiving, selecting, substituting and determining are performed using a processor.

Also disclosed is a method for estimating a probability of a slip of a fracture in an earth reservoir. The method includes: receiving a stress field of a reservoir that includes a pore pressure field for a rock volume; selecting a search radius extending from a grid cell of interest; substituting a pore pressure from a plurality of surrounding grid cells within the selected radius for the pore pressure of the grid cell of interest and determining if a critical stress state exists for each of the substituted pore pressures; determining a shortest distance to a grid cell in the plurality of surrounding grid cells having a pore pressure that yields a critical stress state when substituted in the grid cell of interest; and transmitting a signal comprising the shortest distance via an output interface to a signal receiving device; wherein the receiving, calculating, determining, estimating and using are performed by a processor.

Further disclosed is a non-transitory computer readable medium comprising computer executable instructions for estimating a probability of a slip of a fracture in an earth reservoir that when executed by a computer implements a method. The method includes: receiving a stress field of a reservoir that includes a pore pressure field for a rock volume; selecting a search radius extending from a grid cell of interest; substituting a pore pressure from a plurality of surrounding grid cells within the selected radius for the pore pressure of the grid cell of interest and determining if a critical stress state exists for each of the substituted pore pressures; determining a shortest distance to a grid cell in the plurality of surrounding grid cells having a pore pressure that yields a critical stress state when substituted in the grid cell of interest; and transmitting a signal comprising the shortest distance via an output interface to a signal receiving device.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

For cap rock integrity studies a common practice is to incorporate the results of a reservoir simulation into a dynamic three-dimensional geomechanical model to solve for the evolution of the stress field. This is usually done by one-way coupling. The result of the combined analysis is an effective stress field which can then be analyzed for conditions of tensile fracturing or for critically stressed fractures. As disclosed herein, the same fracture analyses are modified to not only probe the in-situ pore pressure but also proximal (i.e., surrounding) pore pressures to be tested with the in-situ stress conditions. The modified analysis determines the nearest distance between a point of interest and a location having critical pressures to cause fracture slip or fracture creation if pressure communication would exist. This modified analysis accounts for the effects of fluid conduits that are not captured in the original analyses and is therefore a useful addition to cap rock integrity analyses.

In subsurface modelling, the evolution of the pore pressure and temperature is extensively modelled for scenarios such as stimulation, production/injection and the application of enhanced recovery techniques through the use of reservoir simulators. The result of these simulations is generally a pore pressure and temperature field (P/T) that changes over time. The properties which are a product of the simulation may have a significant impact on the sub-surface stress conditions. These stresses are generally difficult to predict as the acting processes are complex: as the pore pressure changes, the stress magnitudes also change (stress path); porous and weak layers may compact with decreasing pore pressure causing subsidence; and elevated temperatures caused by steam injection may lead to local thermal expansion of the rock.

The changes in the effective stresses in the system on the other hand also mean that any potential existing fractures may be activated or new fractures may even be created which would change the fluid flow properties of the reservoir system. For example, an increase in pressure may activate shear fractures or faults leading to effective permeable path ways. A compacting reservoir may increase the shear stress on the bounding faults which might lead to seismicity and a loss of the sealing integrity of the reservoir system.

At present, the industry commonly uses a one-way coupling in which the P/T results of a reservoir simulator are entered into a geomechanical simulation in which the stress field is calculated. In the end, a four-dimensional field of the stress and pressure conditions is presented.

Figure 1:
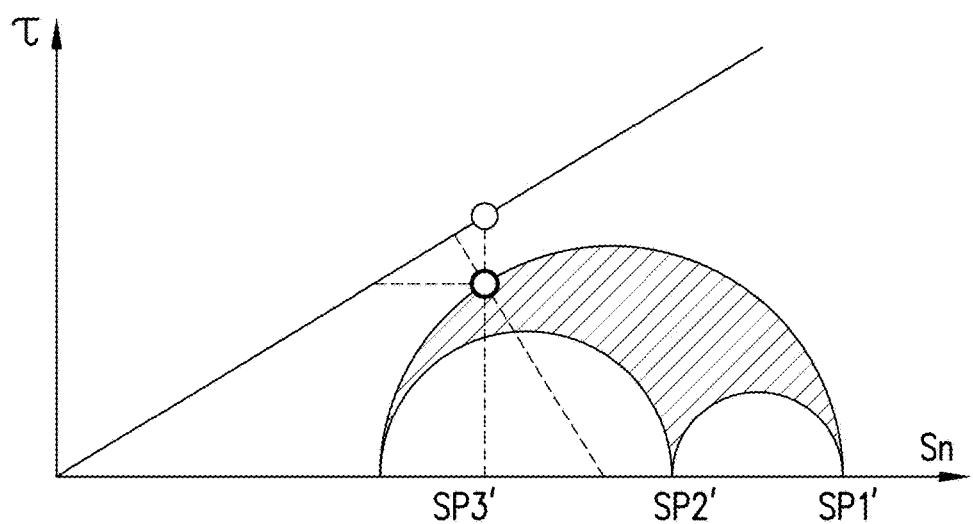
FIG. 1 depicts aspects of critical conditions when using Mohr space.

Next, a directionless fault stability analysis (DFSA) is discussed. To estimate the potential of having critically stressed fractures or the potential of tensile fracturing of intact rock, it is possible to calculate whether any potential critical fractures exist or whether the conditions for tensile fracturing are met. Under the assumption of a Mohr-Coulomb fracturing criteria, the two effective principal stresses SP1' and SP3' can be used to test for critical fracture conditions. Plotted in Mohr Space, critical conditions would apply when the Mohr Circle spanned by SP1' and SP3' would touch or cut the failure envelope for fractures. An example of the stress representation in Mohr Space is illustrated in FIG. 1. A common failure envelope is defined by no offset (cohesion=0) and a slope defined by the sliding friction coefficient ($\eta$=0.6). Under these conditions, the stability state can be calculated for example by calculating the most critical orientation and obtain a directionless Tau Ratio. FIG. 1 illustrates a construction of the "most-critical" orientation in Mohr space. The most critical stress state is constructed by drawing a line normal to the sliding envelope which penetrates the center of the circle spanned by the effective principal stresses SP3' and SP1'. The shear stress component of point of interest P can then be compared with the critical shear stress that lies on the sliding envelope. In FIG. 1, the horizontal axis Sn is the effective normal stress and the vertical axis $\tau$ is shear stress. The ratio of the two latter shear values corresponds to a directionless tau ($\tau$) ratio (i.e., shear stress/critical shear stress). For teaching purposes, the stress conditions in three dimensional space can be expressed by a positive symmetric tensor. The principal components or Eigenvalues of the tensor are called the three principal stresses. As is known in the art, the effective principal stresses are derived by subtracting the pore pressure from the three absolute principal stresses. Effective stresses are marked by a prime symbol. To determine whether a fracture or fault is considered stable, one needs to calculate the effective normal stress component and shear stress component of the fracture plane. This is done in respect of the orientation of the plane to the tensor reference system as planes with different orientations yield different results. The construction of the Mohr Circle is a graphical representation of the possible stress conditions. Three half-circles are constructed by marking the magnitudes of the three effective principal stresses on the horizontal effective normal stress axis. The space made from these three circles encloses all possible combinations of effective normal stress and shear stress for all possible fracture orientations. In combination with a failure envelope one can quickly visually derive whether the stress tensor holds critical conditions In that the application of the Mohr Circle is known in the art, it is not discussed in further detail.

Figure 2A:
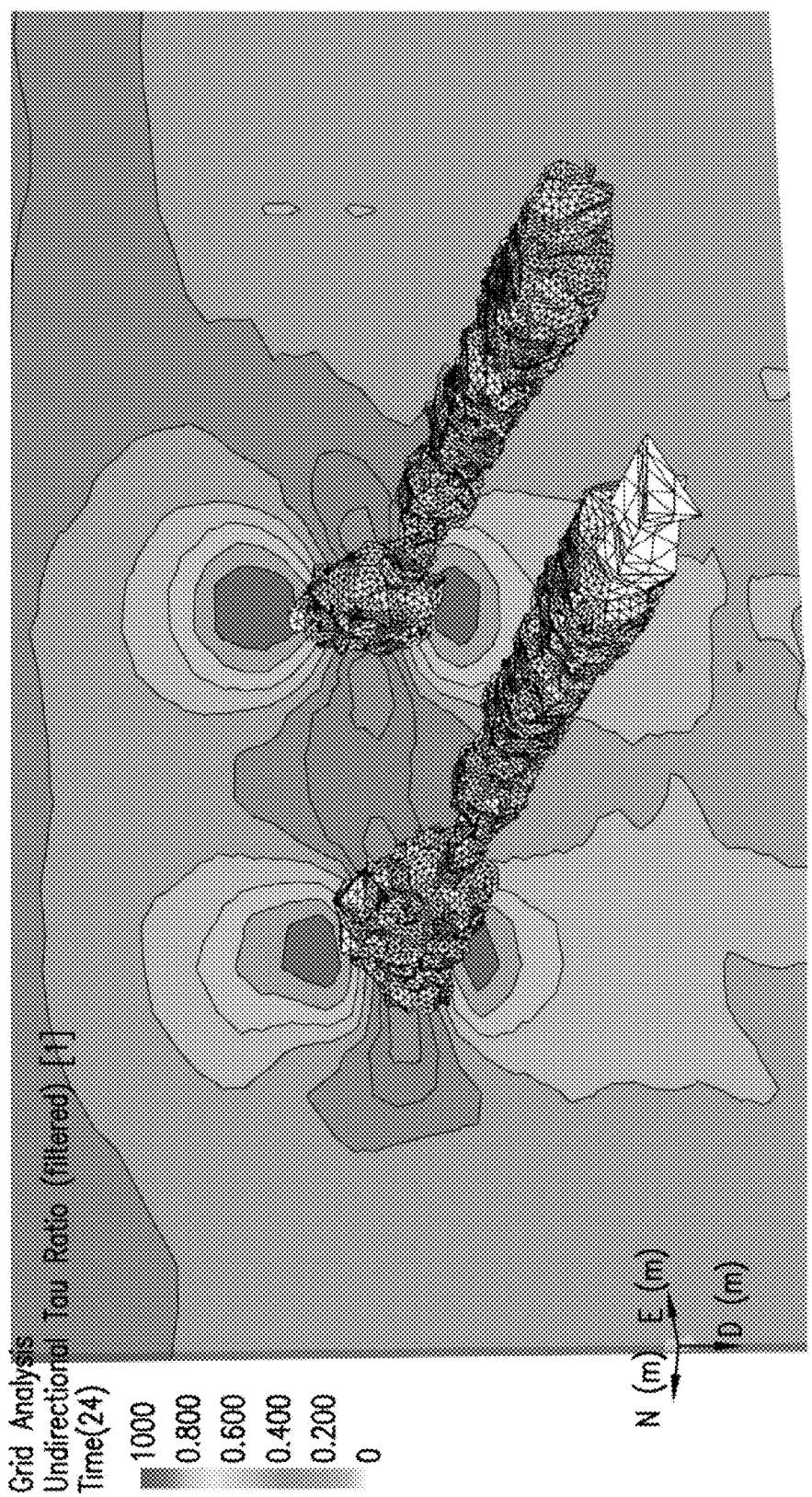
FIGS. 2A and 2B, collectively referred to as FIG. 2, depict aspects of a directionless fracture stability analysis performed on an example SAGD project.
Figure 2B:
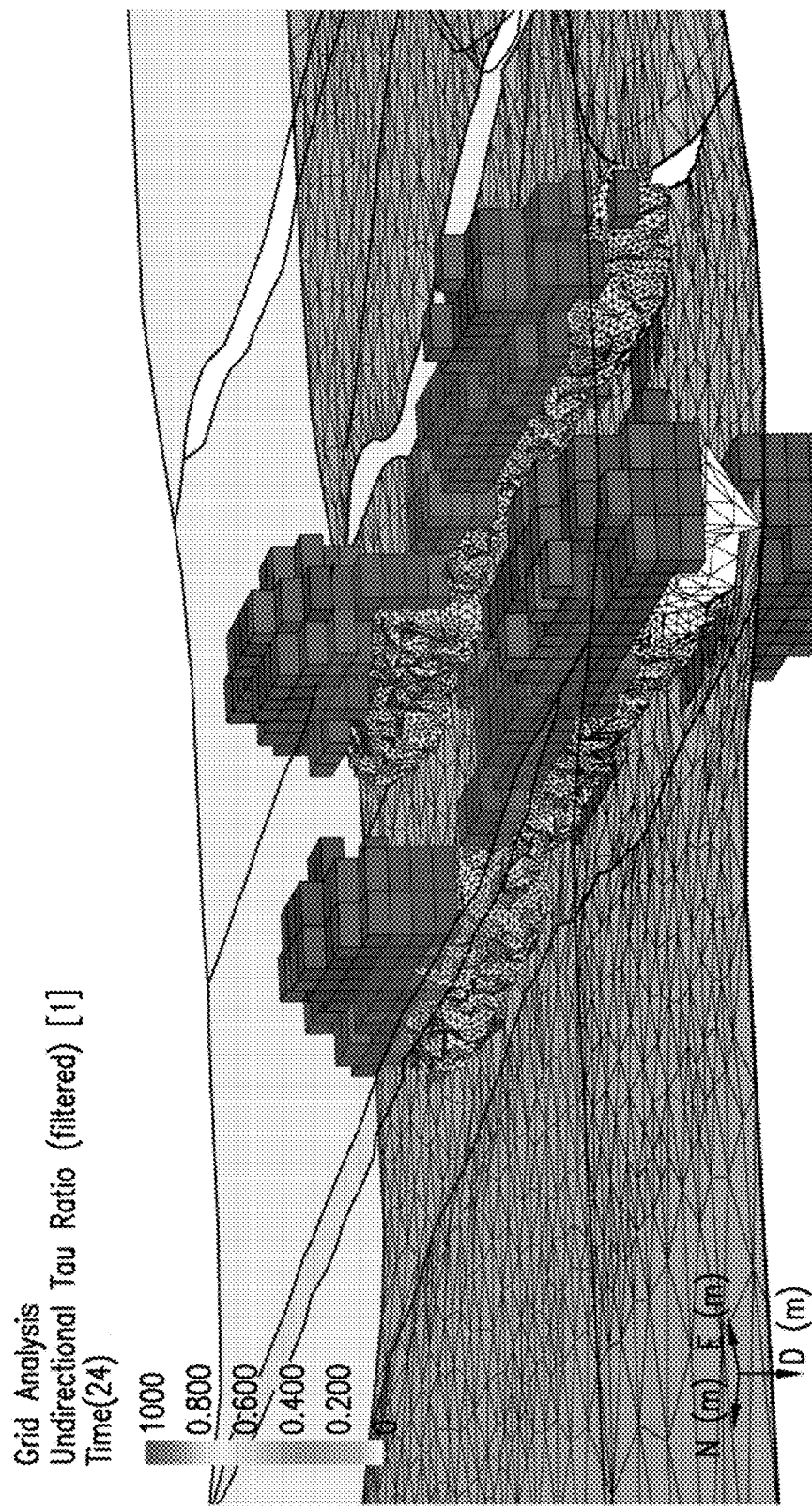

FIGS. 2A and 2B illustrate the DFSA performed on a SAGD project. The white volume in the middle shows the rock body with elevated temperatures which changes the local stresses due to thermal expansion. The two layers in FIG. 2B correspond to the top and the bottom of the reservoir. Calculated here are is the directionless Tau Ratio for the in-situ stress and in-situ pressure field. The DFSA assumes the worst possible fracture orientation and calculates the Tau Ratio for every grid cell in a volume. The results are shown in FIG. 2A on a cross section. In FIG. 2B, the most critical values of the analysis are rendered as discrete grid cells. Dark gray values correspond to the critical values of Tau Ratio close to 1.0 and higher. The triad in FIGS. 2A and 2B (also FIGS. 5A-5D) relate to directions North (N), East (E) and Depth (D).

In addition, the possibility for tensile fracturing or fracture slip may be calculated. This can be done in a simple manner, as is known in the art, by testing whether the pore pressure PP exceeds the absolute minimum principal effective stress SP3'. If SP3'=SP3-PP is smaller than 0, then tensile fracturing is possible under the assumption that the rock has a negligible tensile strength.

Figure 3:
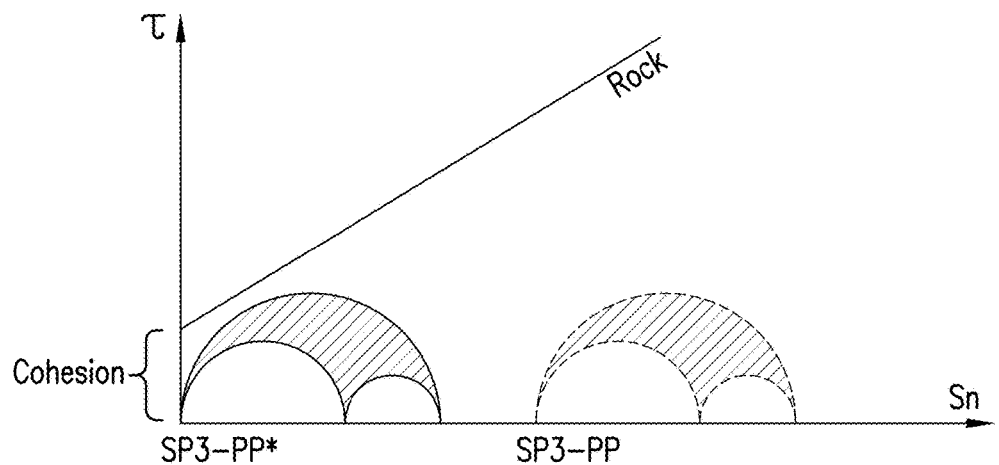
FIG. 3 depicts aspects of a concept for testing for tensile fracturing.

Next, a cap rock integrity analysis (CRIA) using proximal or surrounding pore pressures is discussed. A potential shortcoming of the DFSA is that these analyses are using the in-situ pore pressure and the in-situ stresses only. As disclosed herein, the directionless fault stability analysis is extended by not using the in-situ pore pressure alone, but also testing the proximal or surrounding pore pressure values. The idea behind this is to account for fluid flow through any hydraulic system which is not accounted for in the reservoir simulation. In general, the reservoir simulators use a dual-continuum approach in which the permeability contribution of the fracture network is accounted for by a representative 'equivalent permeability'. Apart from the fact that an upscaled 'equivalent parameter' cannot accurately capture the flow in individual fractures, the potential fracture network itself is very difficult to define in the first place. Because of that, the exact hydraulic system may not be captured accurately with conventional reservoir simulation. Pressure communication through the fracture network may not be accurately represented. As disclosed herein, the in-situ stress state, as calculated by coupling the reservoir results to the geomechanical simulation, is used to test the absolute stress state not only with the in-situ pore pressure of the reservoirs simulator but also with the pore pressures in the proximity or surrounding area as illustrated in FIG. 3. A lateral search distance and the vertical search distance are to be defined by the user in which the proximal tests are to be carried out. By doing this, a potential fluid conduit system, which may increase the local pore pressure not captured by the reservoir simulation, is "tested". If one or more proximal or surrounding locations exist which hold pore pressures high enough to cause critical conditions (i.e., activating shear fractures or tensile fracturing of intact rock), the shortest distance to these locations is stored.

Figure 5A:
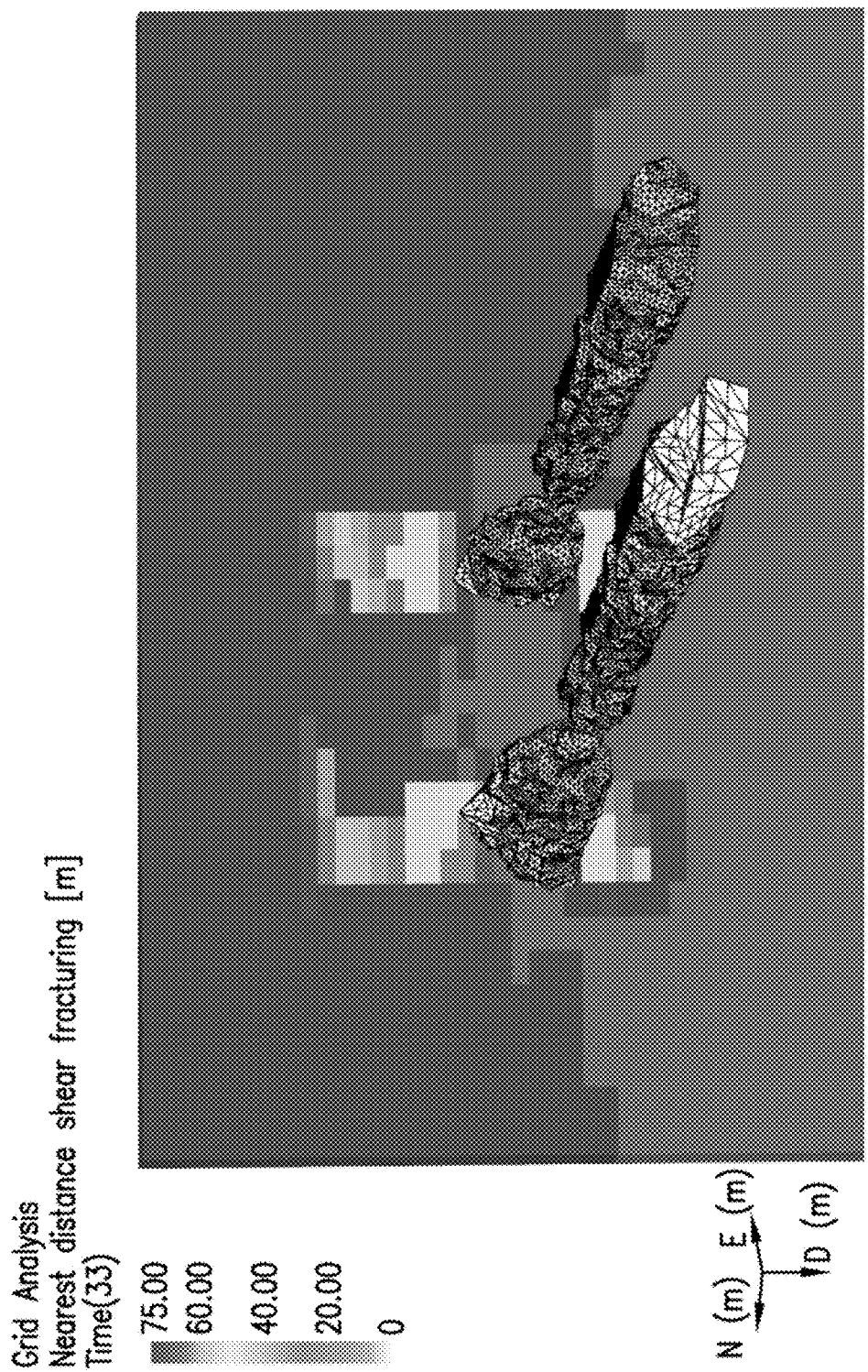
FIGS. 5A, 5B, 5C and 5D, collectively referred to as FIG. 5, depict aspects of results of an analysis to test for the potential of shear fracturing and tensile fracturing using surrounding pore pressures.
Figure 5B:
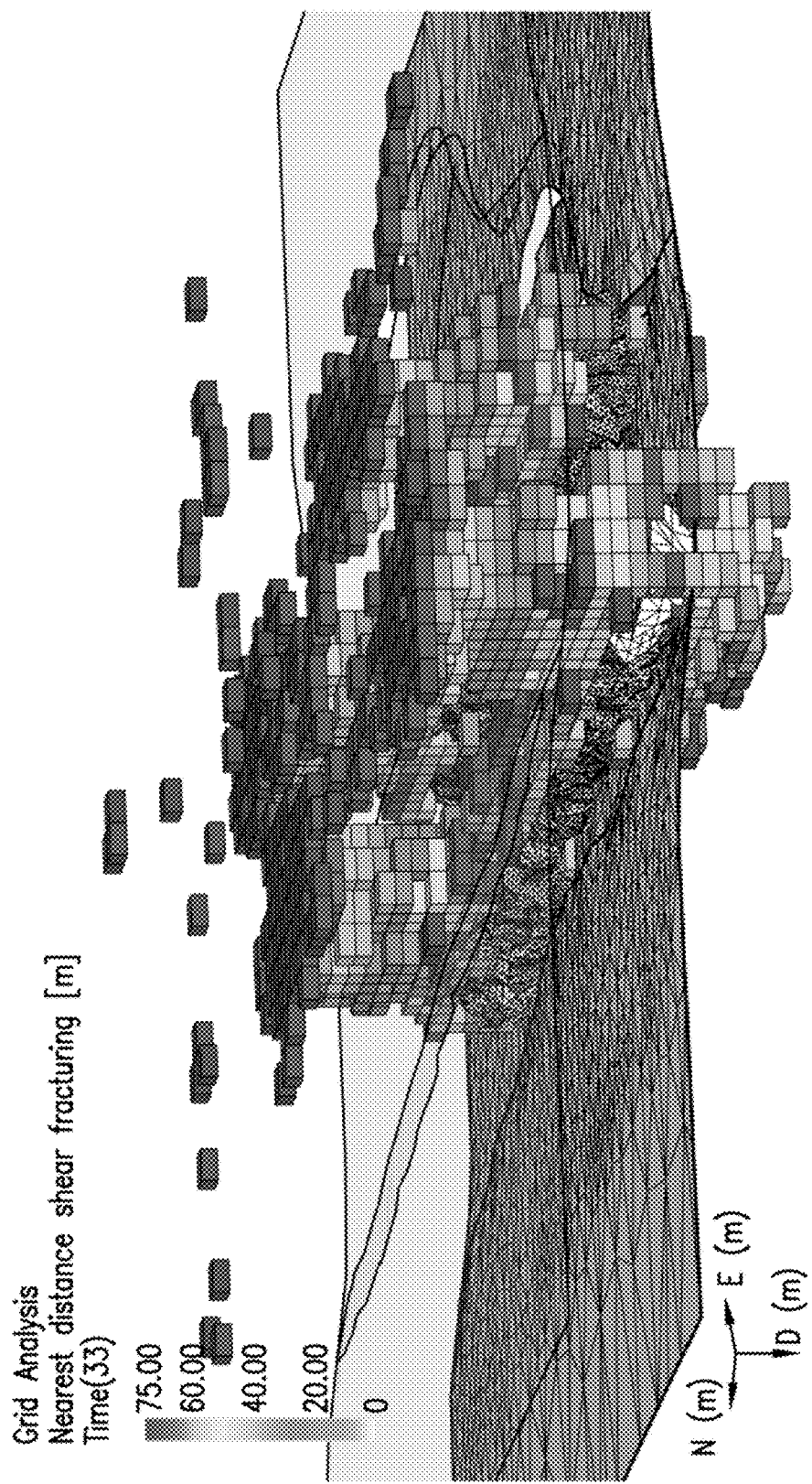
Figure 5C:
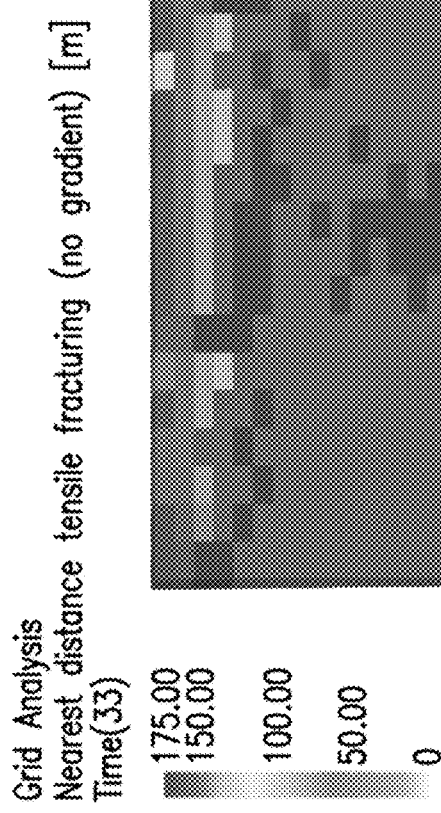
Figure 5D:
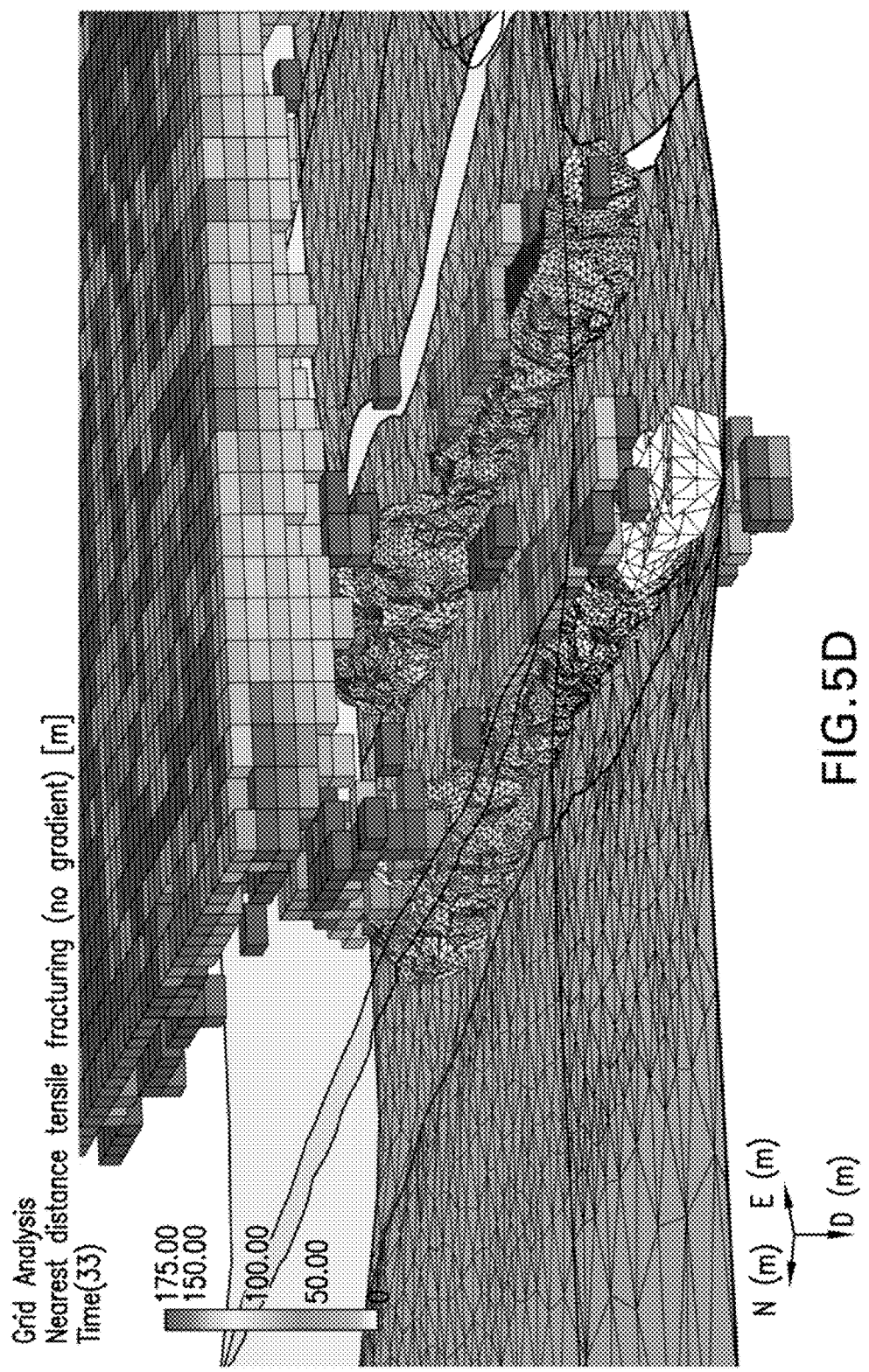

In this way, a scenario having a proximal elevated pore pressure in pressure communication to the point of interest would be captured. Scenarios for this could be (1) fluid conduits not captured accurately, (2) fluid conduits activated by, for example, reaching critical stress state or (3) fluid conduits created by stimulation such as hydraulic fracturing. Short distances would indicate high risk for fracture activation or tensile fracturing. This analysis would therefore be a potential addition to cap rock integrity test as illustrated in FIG. 5. In FIG. 5A, results of analysis to test for the potential of shear fracturing using proximal pore pressures are illustrated on a cross section. In FIG. 5B, the same analysis is shown in which only critical distances of less than 75 meters (m) are rendered as discrete cells. The 75 m distance was chosen as it corresponds approximately to the thickness of the reservoir. It is noted that no pressure correction, such as for gravitational effects, is applied in the example shown in FIG. 5A and FIG. 5B. (Original search radius was 200 m lateral and 200 m vertical). However, it can be seen that with pressure communication, much larger portions of the reservoir and cap rock may become critically stressed. The rock body with the elevated temperatures is rendered as reference. In FIG. 5C, results of analysis for the tensile fracturing potential using proximal pore pressures are illustrated and shown on a cross section. As with previous figures, FIG. 5D shows the same analysis but rendering the critical cells of the volume. Here, distances up to 175 m are rendered. Again, no pressure correction is applied. These results may be compared with the results illustrated in FIG. 2. The rock body with the elevated temperatures is rendered as reference. In one or more embodiments, the potential, probability or risk of or fracture activation or tensile fracturing at a certain point is a relative measure with respect to other points. For example, a shorter distance for a fluid conduit to provide a critical stress state at a first point P1 provides a higher fracture potential at P1 than a longer distance for a fluid conduit to provide a critical stress state at a second point P2. By knowing the relative fracturing potentials, the reservoir engineer can make reservoir production decisions accordingly. By encountering small distances between the in-situ stress and a critical pore pressure a reservoir engineer could recognize the risk for un-intentional fracture activation and change the operational constraints to minimize the risk for fracturing. This could be—among others—changing the production scheme, changing injection pressures, reducing temperatures of injected fluids or durations of injection periods.

Figure 4:
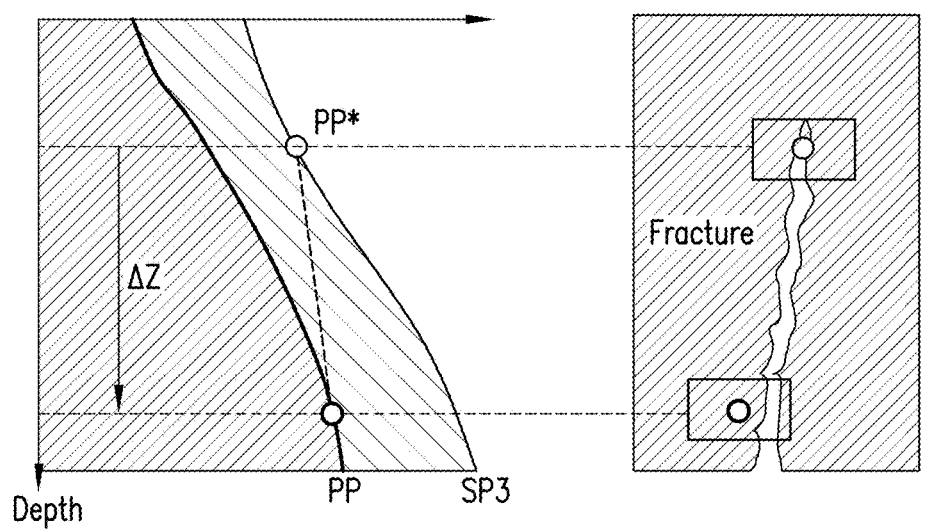
FIG. 4 depicts aspects a cap rock integrity test for the tensile fracturing in one dimension.

Next, pressure adjustment for proximal or surrounding pore pressures is discussed. In order to use the proximal pore pressures for the CRIA, a pore pressure correction may be applied. Hence, the proximal (i.e., surrounding) pore pressures may need to be corrected in order to take into account gravitational effects. In a vertical fluid column, the pressure higher up in the column decreases based on the bulk density mid of the fluid. The vertical distance AZ between the point of interest and the proximal pressure point needs to be taken into account in combination with the fluid pressure as illustrated in FIG. 4. The pressure may be adjusted in accordance with the following equation: $PP^* = PP - \Delta Z \cdot 9.8065 \text{ m/s}^2 \cdot \rho_{Fluid}$. In FIG. 4, the principle of the cap rock integrity test for the tensile fracturing is illustrated in one-dimension. In this test, pressure communication through hydraulically connected fractures is assumed which may allow local pressures to affect proximal regions. Defining a fluid density gradient, the local absolute least principal stress SP3 is compared with the pore pressures surrounding it. Within a search distance specified by the user, the nearest distance to cell containing excess pore pressures is determined. The nearest distance for each cell in a three-dimensional grid is used as a relative measure of potential, probability or risk of fracture in comparison to the corresponding distances of the other grid cells.

Next, work flow steps for DFSA are presented.
1. Take as input the result of a physical simulation which delivers a full three-dimensional stress field taking into account a pore pressure field. The stress field is generally provided as tensor components.
2. If the stress field is absolute, subtract the pore pressure from its diagonal components to form effective stress tensors.
3. From the effective stress tensors determine the Eigenvalues. Sort the Eigenvalues so that the values are SP1'≥SP2'≥SP3'.
4. Define a fault/fracture sliding friction coefficient ii.
5. Calculate the parameter r=½·(SP1'−SP3') which corresponds to the radius of the outer Mohr circle.
6. Calculate the parameter m=SP3'+r which corresponds to the x-value of the latter circle's centre point.
7. Calculate the friction angle α from the friction coefficient η by α=atan(η)
8. Calculate the most critical shear stress τ=sin(90°−α)·r
9. Calculate the corresponding normal stress Sn=m−cos(90°−α)·r
10. Calculate the critical shear stress τcrit=Sn·η which corresponds to the theoretical critical shear stress in respect the calculated Sn.
11. Calculate the directionless Tau ratio τratio=τ/τcrit
12. Calculate the directionless Coulomb failure function CFF=τ−τcrit
13. Calculate the directionless critical injection pressure IPcrit=Sn−τ/η
14. Other parameters such as critical pore pressure PPcrit, critical friction coefficient, critical cohesion may also be calculated.

Next, work flow steps for CRIA, tensile fracturing, are presented.
1. Take as input the result of a physical simulation which delivers a full 3-D stress field that includes a pore pressure field. The stress field is generally in the form of tensor components. (This step may include defining a grid representing the reservoir.)
2. From the absolute stress tensor components determine the Eigenvalues. Sort the Eigenvalues so that SP1≥SP2≥SP3. Extract the minimum principal absolute pressure SP3.
3. Define a fluid density for the pressure correction $\rho_{correction}$ if pressure correction is anticipated.
4. Define a lateral search distance DL.
5. Define a vertical search distance DV.
6. Identify a pore pressure field PP.
7. For a cell (i) within any grid, lookup the local SP3 value SP3(i) and its location L(i).
8. Lookup the pore pressure values PP(j) (j=0 . . . n) which are in the proximity of the cell i. This means the lateral dL(i,j) distance is smaller or equal to DL and the vertical distance dv(i,j) is smaller or equal to DV. Only depths of PP(j) equal or greater as that of cell i are accepted. (In this non-limiting scenario, fluid flow lateral and upwards is considered, but not downwards.)
9. Correct the fluid density of PP(j) to obtain PP*(j) to accommodate the pressure change due to gravitational effects. With a vertical distance of dv(i,j) the pressure PP*(j) is $PP^*(j) = PP(j) - G \cdot \rho_{correction} \cdot dv(i,j)$ with G being the gravitational constant (G=9.8065 m/s²).
10. If any PP*(j) is >=SP3(i) then store the smallest distance in cell i. If no pressure PP*(j)>SP3(i) is found then store NULL in the cell i.
11. Repeat steps 7-10 for all cells Next, work flow steps for CRIA, shear fracturing, are presented.
1. Define a sliding friction coefficient ii.
2. Take as input the result of a physical simulation which delivers a full 3-D stress field that includes a pore pressure field. The stress field is typically delivered as tensor components. (This step may include defining a grid representing the reservoir.)

3. From the absolute stress tensor components determine the Eigenvalues. Sort the Eigenvalues so that SP1≥SP2≥SP3. Extract the minimum principal absolute pressures SP1 and SP3.

4. Define a fluid density for the pressure correction $\rho_{correction}$.

5. Define a lateral search distance DL.

6. Define a vertical search distance DV.

7. Identify a pore pressure field PP.

8. For a cell (i) within any grid lookup the local SP1 and SP3 value SP1($i$), SP3($i$) and its location L(i).

9. Lookup the pore pressure values PP(j) (j=0 . . . n) which are in the proximity of the cell i. This means the lateral dL(i,j) distance is smaller or equal to DL and the vertical distance dv(i,j) is smaller or equal to DV. Only depths of PP(j) equal or greater as that of cell i are accepted. (In this non-limiting scenario, fluid flow lateral and upwards is considered, but not downwards.)

10. Correct the fluid density of PP(j) to obtain PP*(j) to accommodate the pressure change due to gravitational effects. With a vertical distance of dv(i,j) the pressure PP*(j) is PP*(j)=PP(j)−G·$\rho_{correction}$·dv(i,j) with G being the gravitational constant (G=9.8065 m/s2).

11. Perform a DFSA using 11, the local SP1($i$) and SP3($i$) and the PP*(j=0 . . . n). Determine which PP*(j) are leading to critical Tau Ratios (τratio≥1.0). Store the smallest distance to a critical value in the cell i. If no critical value is among the PP*(j) values, then store NULL in the cell.

12. Repeat the steps 8-11 for all cells.

The above disclosed CRIA, tensile fracturing, and/or CRIA, shear fracturing, methods may also include providing a relative potential, probability or risk value of a tensile or shear fracture for each grid cell based on the relative distance to a closest surrounding or proximal grid cell having a critical value.

The above disclosed CRIA, tensile fracturing, and/or CRIA, shear fracturing, methods may also include using (or entering) the relative potential, probability or risk value of a tensile or shear fracture for each grid cell in an algorithm to calculate a parameter for a hydrocarbon production process to produce hydrocarbons from the reservoir. In one or more embodiments, the parameter is an amount of steam to be injected using a SAGD process. Other production processes may also be used.

Figure 6:
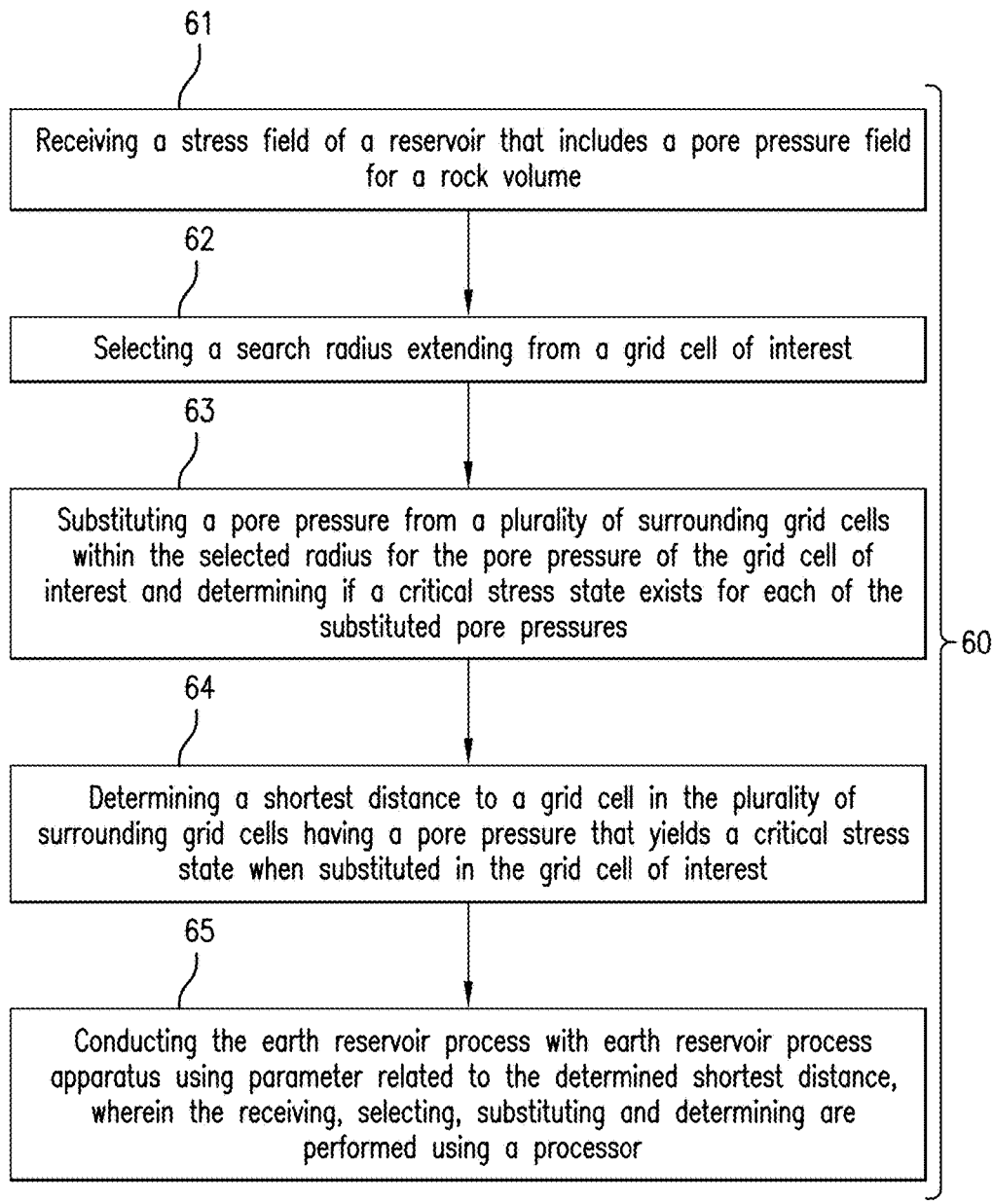
FIG. 6 is a flow chart for a method for conducting an earth reservoir process.

FIG. 6 is a flow chart for a method 60 for conducting an earth reservoir process. Block 61 calls for receiving a stress field of a reservoir that includes a pore pressure field for a rock volume. The rock volume may be represented by a grid. Block 62 calls for selecting a search radius extending from a grid cell of interest. In one or more embodiments, the search radius includes the entire earth reservoir. In another embodiment, the search radius extends to a closest boundary of the earth reservoir. Selecting a search radius may include defining a lateral search distance DL and a vertical search distance DV. It can be appreciated that decreasing the search radius may reduce the corresponding amount of computational time required to implement the method.

Block 63 calls for substituting a pore pressure from a plurality of surrounding grid cells within the selected radius for the pore pressure of the grid cell of interest and determining if a critical stress state (i.e., having a critical stress value) exists for each of the substituted pore pressures. Block 64 calls for determining a shortest distance to a grid cell in the plurality of surrounding grid cells having a pore pressure that yields a critical stress state when substituted in the grid cell of interest. It can be appreciated that the value of the shortest distance (such as with respect to distances to other grid cells in the plurality of surrounding grid cells that have a pore pressure that yields a critical stress state in the grid cell of interest) provides an indication or measure of a probability, likelihood or risk of the grid cell of interest being in a critical stress state. The probability, likelihood or risk of the grid cell of interest being in a critical stress state is related to the probability, likelihood or risk of a fluid pathway existing to the closest surrounding grid cell in the plurality that yields the critical stress state with the substituted pore pressure. Similarly, the shortest distance value provides an indication or measure of a probability, likelihood or risk of the grid cell of interest having slip of an existing fracture and, thus, causing the critical stress state. With respect to determining probability, likelihood or risk, in one or more embodiments, measures of these values may be calculated using a ratio of the shortest determined distance to the longest determined distance. For example, if the longest distance is twice as far as the closest distance, then the probability, likelihood or risk of the grid cell of interest being in a fluid communication with the closest grid cell that provides a substituted pore pressure that yields a critical stress state in the grid cell of interest may be calculated to be twice as much as for the grid cell of interest to be in fluid communication with the farthest grid cell that provides a substituted pore pressure that yields a critical stress state in the grid cell of interest. This is just one example. Other types of calculations may also be made using coefficients and exponents based on experience. As an alternative to selecting the shortest distance, the grid cell from the plurality of grid cells may be selected according to a selection criterion of which the shortest distance is one embodiment of the criterion. Other embodiments may include a certain number of grid cells yielding the critical stress state in the plurality within a defined radius of the grid cell of interest. Other selection criteria may also be used. In general, the receiving, selecting, substituting and determining are performed by a processor which may be in a computer processing system.

Figure 7:
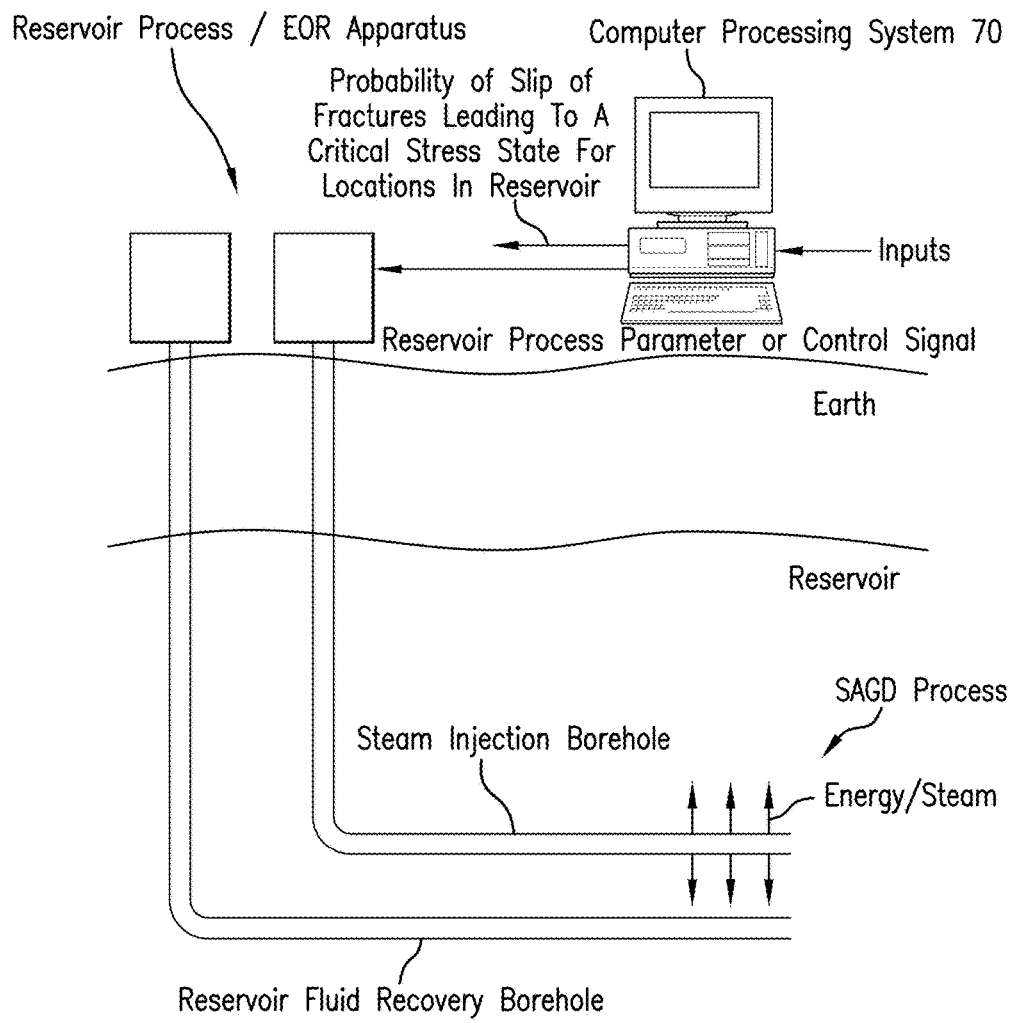
FIG. 7 depicts aspect of a computer processing system for implementing methods disclosed herein.

Block 65 calls for conducting the earth reservoir process with earth reservoir process apparatus using the shortest distance as an indication of the probability, likelihood or risk of the grid cell of interest being in a critical stress state. The method 60 may also include transmitting a signal having the shortest determined distance via an output interface to a signal receiving device configured to display the shortest distance or indication of the probability, likelihood or risk of the grid cell of interest being in a critical stress state. It can be appreciated that the grid cell of interest may include a plurality of grid cells of interest to give an overall picture of the probability, likelihood or risk of each of the grid cells of interest being in a critical stress state. Non-limiting embodiments of the signal receiving device include a display monitor, a printer, memory, a storage medium, or controller. The controller may be implemented by a computer processing system 70 as illustrated in the embodiment of FIG. 7. The controller is configured to automatically control one or more reservoir process components based on the probability, likelihood or risk of one or more grid cells of interest being in a critical stress state such as by having one or more existing fractures slip. Also illustrated in FIG. 7 are reservoir process apparatuses such as used for enhanced oil recovery (EOR). While a SAGD embodiment is illustrated in FIG. 7, in alternative embodiments the EOR components may be configured for water injection and/or $CO_2$ injection. In a SAGD embodiment, the controller may be configured to control an amount of energy injected into the reservoir such as by controlling an amount of steam and/or temperature of the steam for example.

The method 60 may also include optionally accounting for the effects of gravity on pressure changes by for example (a) defining a fluid density $\rho_{correction}$ for the pressure correction and (b) correcting the fluid density of PP(j) to obtain PP*(j) to accommodate the pressure change due to gravitational effects, such that with a vertical distance of dv(i,j) the pressure PP*(j) is PP*(j)=PP(j)−G·$\rho_{correction}$·dv(i,j) with G being a gravitational constant.

The disclosed cap rock integrity analysis with proximal pore pressures accounts for uncaptured fluid conduits. As these cannot be incorporated easily into the original reservoir models, fluid communication through fractures (either pre-existing or created) is not captured in the conventional reservoir simulation nor is it in the conventional geomechanical simulation. The disclosed proximal analysis picks up the surrounding pressures and tests them to reveal the shortest distance to a critical pressure value. This value can be used as one risk assessment measure for fracture stability and tensile fracturing and thus may be useful (but not restricted) for cap rock integrity analysis.

It can be appreciated that while the above methods are not restricted to cap rock. These methods may be applied throughout a model of an earth formation. However, the cap rock integrity analysis is a prominent application.

In support of the teachings herein, various analysis components may be used, including a digital and/or an analog system. For example, the computer processing system 70 may be used to implement the methods disclosed herein and may include digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure. Processed data such as a result of an implemented method may be transmitted as a signal via a processor output interface to a signal receiving device. The signal receiving device may be a display monitor or printer for presenting the result to a user. Alternatively or in addition, the signal receiving device may be memory or a storage medium. It can be appreciated that storing the result in memory or the storage medium will transform the memory or storage medium into a new state (containing the result) from a prior state (not containing the result). Further, an alert signal may be transmitted from the processor to a user interface if the result exceeds a threshold value.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for conducting a selected earth reservoir physical process, the method comprising:
   receiving a stress field of a reservoir that includes a pore pressure field for a rock volume;
   selecting a search radius extending from a grid cell of interest;
   substituting a pore pressure from a plurality of surrounding grid cells within the selected radius for the pore pressure of the grid cell of interest and determining if a critical stress state exists for each of the substituted pore pressures;
   determining a shortest distance to a grid cell in the plurality of surrounding grid cells having a pore pressure that yields a critical stress state when substituted in the grid cell of interest; and
   at least one of changing an injection pressure of an injected fluid and changing a temperature of an injected fluid in an enhanced production process with enhanced production process apparatus based on the determined shortest distance such that a risk of fracturing rock is reduced;
   wherein the receiving, selecting, substituting and determining are performed using a processor.

2. The method according to claim 1, wherein the search radius comprises the entire earth reservoir.

3. The method according to claim 2, wherein the search radius is a closest distance to a boundary of the earth reservoir.

4. The method according to claim 1, wherein the enhanced production process is an enhanced hydrocarbon production process configured to recover hydrocarbons.

5. The method according to claim 4, wherein the enhanced hydrocarbon production process comprises an enhanced oil recovery process.

6. The method according to claim 5, wherein the enhanced oil recovery process is a steam assisted gravity drainage process.

7. The method according to claim 6, further comprising at least one of setting a limit to an operational parameter and changing an operational constraint in the enhanced production process with the enhanced production process apparatus, wherein the at least one of the operational parameter and the operational constraint is an amount of energy to be injected into the earth reservoir.

8. The method according to claim 7, wherein an amount of steam and/or a steam temperature is controlled to control the amount of energy to be injected.

9. The method according to claim 1, wherein:
the stress field comprises a stress tensor and calculating comprises determining Eigenvalues of the stress tensor;
determining if a critical stress state exists for each of the substituted pore pressures comprises sorting the Eigenvalues so that SP1≥SP2≥SP3 and extracting the minimum principal absolute pressures SP1 and SP3 for each grid cell in the stress field; and
the method further comprises:
defining a lateral search distance DL;
defining a vertical search distance DV;
determining the local SP3 value SP3($i$) and its location L(i) for grid cell (i);
determining the pore pressure values PP(j) (j=0 . . . n) which are in the proximity of the grid cell i such that the lateral dL(i,j) distance is smaller or equal to DL and the vertical distance dv(i,j) is smaller or equal to DV only for depths of PP(j) equal or greater as that of cell i; and
determining which PP*(j) are leading to critical Tau Ratios where τratio≥1.0 using the local SP1($i$) and SP3($i$) and the PP*(j=0 . . . n) and storing the smallest distance to a critical value in the grid cell i.

10. The method according to claim 9, further comprising:
defining a fluid density $\rho_{correction}$ for the pressure correction; and
correcting the fluid density of PP(j) to obtain PP*(j) to accommodate the pressure change due to gravitational effects, such that with a vertical distance of dv(i,j) the pressure PP*(j) is PP*(j)=PP(j)−G·$\rho_{correction}$·dv(i,j) with G being a gravitational constant.

11. The method according to claim 9, further comprising storing a null value for a grid cell (i) if there is no distance to a surrounding grid cell having a pore pressure that when substituted into the grid cell of interest yields a critical stress state for the grid cell of interest.

12. The method according to claim 9, wherein the critical stress state comprises a shear fracture and the method further comprises providing a value for a sliding friction coefficient η.

13. The method according to claim 1, further comprising determining a value of probability, likelihood or risk of the grid cell of interest being in fluid communication with the grid cell in the plurality having the determined shortest distance and using the value for conducting the selected earth reservoir physical process.

14. The method according to claim 13, wherein the probability, likelihood or risk is with respect to other grid cells in the plurality having a pore pressure that when substituted in the grid cell of interest yields a critical stress state.

15. A method for estimating a probability of a slip of a fracture in an earth reservoir, the method comprising:
receiving a stress field of a reservoir that includes a pore pressure field for a rock volume;
selecting a search radius extending from a grid cell of interest;
substituting a pore pressure from a plurality of surrounding grid cells within the selected radius for the pore pressure of the grid cell of interest and determining if a critical stress state exists for each of the substituted pore pressures;
determining a shortest distance to a grid cell in the plurality of surrounding grid cells having a pore pressure that yields a critical stress state when substituted in the grid cell of interest;
transmitting a signal comprising the shortest distance via an output interface to a signal receiving device;
estimating the probability of a slip of a fracture based on the shortest distance; and
at least one of changing an injection pressure of an injected fluid and changing a temperature of an injected fluid in a fluid injection process with fluid injection apparatus based on the estimated probability such that a risk of fracturing rock is reduced;
wherein the receiving, calculating, determining, estimating and using are performed by a processor.

16. The method according to claim 15, further comprising accounting for gravitational effects in substituting the pore pressure from a plurality of surrounding grid cells.

17. The method according to claim 15, wherein the signal receiving device comprises at least one of a computer display, printer, memory, storage medium and controller.

18. The method according to claim 15, wherein the grid cell of interest comprises a plurality of grid cells of interest.

19. The method according to claim 18, further comprising displaying the shortest distance for each grid cell in the plurality to a user.

20. A non-transitory computer readable medium comprising computer executable instructions for estimating a probability of a slip of a fracture in an earth reservoir that when executed by a computer cause an apparatus to implement a method comprising:
receiving a stress field of a reservoir that includes a pore pressure field for a rock volume;
selecting a search radius extending from a grid cell of interest;
substituting a pore pressure from a plurality of surrounding grid cells within the selected radius for the pore pressure of the grid cell of interest and determining if a critical stress state exists for each of the substituted pore pressures;
determining a shortest distance to a grid cell in the plurality of surrounding grid cells having a pore pressure that yields a critical stress state when substituted in the grid cell of interest;
transmitting a signal comprising the shortest distance via an output interface to a signal receiving device comprising a controller;
estimating the probability of a slip of a fracture based on the shortest distance; and
at least one of automatically changing an injection pressure of an injected fluid and automatically changing a temperature of an injected fluid with a controller in a selected earth reservoir physical process based on the estimated probability such that a risk of fracturing rock is reduced.

21. The medium according to claim 20, wherein the method further comprises accounting for gravitational effects in substituting the pore pressure from a plurality of surrounding grid cells.

* * * * *